United States Patent
Katayama et al.

(10) Patent No.: US 6,536,852 B2
(45) Date of Patent: Mar. 25, 2003

(54) RESILIENT CRAWLER AND METHOD OF MANUFACTURE THE SAME

(75) Inventors: Teruyuki Katayama, Sennan-gun (JP); Yasuharu Fukushima, Izumi-Ohtsu (JP); Kenichi Sakai, Kishiwada (JP)

(73) Assignee: Ohtsu Tire & Rubber Co., Ltd., Izumi-Ohtsu ( * ) Notice: Subject to any disclaimer, the term of this patent is extended or adjusted under 35 U.S.C. 154(b) by 0 days.

(21) Appl. No.: 09/915,538

(22) Filed: Jul. 27, 2001

(65) Prior Publication Data

US 2002/0067074 A1 Jun. 6, 2002

(30) Foreign Application Priority Data

Dec. 1, 2000 (JP) .......................... 2000-367372

(51) Int. Cl.$^7$ ............................................... B65G 15/34
(52) U.S. Cl. ........................ 305/170; 305/178; 305/179
(58) Field of Search ................................. 305/170, 171, 305/166, 167, 174, 178, 179, 157, 158, 165, 185

(56) References Cited

U.S. PATENT DOCUMENTS

| | | | | |
|---|---|---|---|---|
| 2,350,076 A | * | 5/1944 | Smith et al. | 305/171 |
| 2,392,988 A | * | 1/1946 | Feck | 305/158 |
| 3,498,684 A | * | 3/1970 | Hallaman | 198/847 |
| 3,582,154 A | * | 6/1971 | Russ, Sr. | 305/166 |
| 3,858,948 A | * | 1/1975 | Johnson et al. | 305/178 |
| 3,900,231 A | * | 8/1975 | Ohm | 305/178 |
| 5,005,922 A | * | 4/1991 | Edwards et al. | 305/170 |
| 6,079,802 A | * | 6/2000 | Nishimura et al. | 305/157 |

FOREIGN PATENT DOCUMENTS

| | | | |
|---|---|---|---|
| JP | 62-265080 | | 11/1987 |
| JP | 04110284 A | * | 4/1992 |
| JP | 189688 A | * | 7/1992 |
| JP | 4-189688 | | 7/1992 |
| JP | 04-189688 | | 7/1992 |
| JP | 04189688 A | * | 7/1992 |
| JP | 06156333 A | * | 5/1994 |
| JP | 8-11549 | | 1/1996 |

* cited by examiner

*Primary Examiner*—S. Joseph Morano
*Assistant Examiner*—Frantz F. Jules
(74) *Attorney, Agent, or Firm*—Nixon Peabody LLP; David S. Safran

(57) ABSTRACT

In a resilient crawler of this invention, sufficient flexibility at the portion between the lugs is obtained and such problems as separation of rubber are prevented while improving riding comfort by reducing the difference in rigidity between the portion where the lug is formed and the portion between the lugs, and improving lateral rigidity to assure the tractive force. Therefore, a resilient crawler of the present invention comprises a crawler body formed of a resilient material in the shape of an endless belt and having a multiplicity of lugs projecting from the outer peripheral surface at intervals longitudinally along the crawler body; and a multiplicity of linear lateral reinforcing members disposed in the crawler body so as to extend laterally thereof and be arranged longitudinally therealong. The lateral reinforcing members are arranged at close intervals with respect to each other in each portion E of the crawler body where the lug is formed, and at large intervals with respect to each other in each portion F between the lugs.

12 Claims, 13 Drawing Sheets

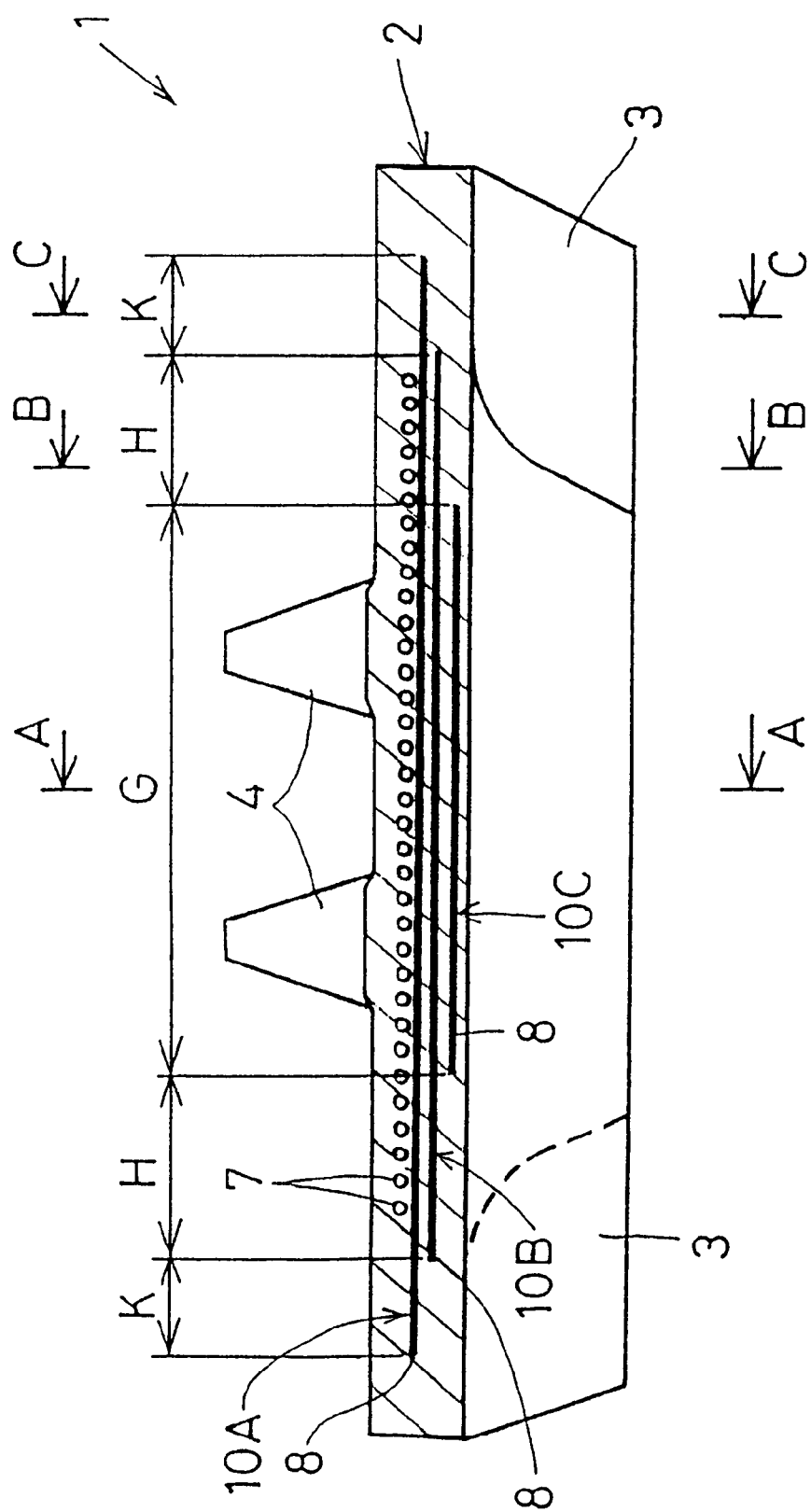

RESILIENT CRAWLER AND METHOD OF MANUFACTURE THE SAME

BACKGROUND OF THE INVENTION

1. Field of the Invention

The present invention relates to a resilient crawler.

2. Description of the Related Art

An endless crawler vehicle to be used for civil engineering machines, construction machines, farm machines, snow mobiles and snow cars comprises a resilient crawler wrapped around a driving wheel, a following wheel, and a rolling wheel on a track frame.

The resilient crawler comprises a crawler body formed of a resilient material such as rubber in the shape of an endless belt, and the crawler body is constructed to be turned by an engaging transmitting system using a sprocket as a driving wheel, or by a friction transmitting system using a drum wheel.

The crawler body includes a lug for traction projecting from the outer peripheral surface at intervals along the longitudinal direction of the belt.

In a conventional resilient crawler of this type, core metals having laterally extending wings are buried at intervals longitudinally along the crawler in order to assure traction or to prevent coming-off of the rolling wheel from the crawler by enhancing rigidity in the widthwise direction of the crawler, i.e., lateral rigidity. However, such core metals increase weight and manufacturing cost of the resilient crawler.

Therefore, a technology in which cords such as wire extending in the direction of the width of the crawler body is buried in the lug instead of, or in addition to the core metal, whereby increasing lateral rigidity and avoiding or minimizing the use of core metals is disclosed in Japanese Examined Patent Publication No. HEI 8-11549 (hereinafter referred to as Related Art 1), Japanese Unexamined Patent Publication No. HEI 4-189688 (hereinafter referred to as Related Art 2).

In the resilient crawler of Related Art 1, a number of cords are buried only in the portions where the lugs are formed (within the lug), and they are not buried in the portions between the lugs.

Therefore, advantageously, lateral rigidity of the lug is enhanced and thus traction is ensured, and the portions between lugs can be bent smoothly when they comes around the driving wheel or the following wheel and thus possibility of occurrence of drive transmission loss can be reduced.

However, since the difference in rigidity between the portion where the lug is formed and the portion between the lugs is significant, the rolling wheel considerably sinks into the crawler body, thereby impairing riding comfort.

On the other hand, in Related Art 2, a resilient crawler having cords buried not only in the portion where the lug is formed, but also in the portion between the lugs is shown.

In this case, a multiplicity of cords are provided at regular intervals along the circumference of the crawler body both in the portion where the lug is formed and the portion between the lugs, and a multiplicity of these materials are provided also within the lug.

Therefore, since the number of the cords in the portion where the lug is formed is increased, the lateral rigidity of the lug is enhanced and the difference in rigidity between the portion where a lug is formed and the portion between the lugs is reduced in comparison with Related Art 1, whereby improvement in riding comfort can be realized.

However, since the cords are arranged at regular intervals both in the portions where a lug is formed and the portions between the lugs, when the intervals between the cords are decreased to increase the number of the cords so that rigidity of the lug is enhanced, the intervals of the cords in the portion between the lugs are also reduced and thus the number of the cords are increased. As a consequence, the flexibility of the crawler around the wheel is impaired, and the quantity of rubber between the lugs decreases, thereby increasing the possibility of occurrence of separation or cracking.

The lateral bending occurring on the resilient crawler is mainly caused by the load of the rolling wheel passing along and thus sinking the lateral center of the crawler body when the vehicle travels on a soft ground or on the snow. However, in Related Art 1 and 2, the cords are buried in almost uniform numbers along the width of the crawler body, and thus rigidity is also uniform along the width. Therefore, when rigidity of the lateral center of the crawler body, which contributes highly to the prevention of bending, is increased, rigidity of both side portions of the width of the crawler body, which contributes less to the prevention of bending, is also increased more than necessary, and thus the weight of the crawler is unnecessarily increased.

On the other hand, in Related Art 1, the cords having almost the same length as the lug are buried in the lug so as to be distributed throughout the lug from the foot portion, or the root of the lug projecting form the crawler body, and the volume proportion of the cords with respect to the lug is in the range between 20% to 70%. In other words, most part of the lug is filled with the cords.

In this state, a resilient material, which is a material forming the crawler body, cannot be sufficiently spread among the cords, and thus the thickness of the resilient material of the surface layer, or at the portion surrounding the cords, of the lug is decreased. As a consequent, separation or cracking may disadvantageously occur relatively easily between the cords or between the layers of the cords and the resilient material.

Even when they are the same in proportion of volume, lateral rigidity of the crawler varies depending on the position where the cords are buried, and thus variation in the position where the cords are buried may disadvantageously cause variation in tractive force, which may result in impairment of its original capability.

OBJECT AND SUMMARY OF THE INVENTION

Accordingly, it is an object of the present invention to assure flexibility between the lugs and prevent separation of rubber while assuring lateral rigidity of the lug by properly disposing lateral reinforcing members in the crawler body without deteriorating riding comfort.

It is another object of the present invention to prevent increase in weight while effectively preventing lateral bending of the crawler body.

It is still another object of the present invention to increase durability by preventing occurrence of separation or cracking of the lug and to obtain a uniform tractive force by the lug.

The first specific means for solving the problems according to the present invention is a resilient crawler comprising: a crawler body formed of a resilient material in the shape of an endless belt and having a multiplicity of lugs projecting from its outer peripheral surface at intervals longitudinally along the crawler; and a multiplicity of lateral reinforcing members in the shape of cords extending laterally (in the widthwise direction) of the crawler body and arranged longitudinally along the crawler body; wherein the lateral reinforcing members are arranged at close intervals with respect to each other in each portion of the crawler body where the lug is formed, and at larger intervals with respect to each other in each portion between the lugs.

In this arrangement, since the difference in rigidity between the portion where the lug is formed and the portion between the lugs is reduced, riding comfort is expected to be improved, and the flexibility between the lugs can be assured and separation of rubber can be prevented while improving lateral rigidity of the lug and obtaining preferable traction.

The second specific means for solving the problems according to the present invention is a resilient crawler comprising: a crawler body formed of a resilient material in the shape of an endless belt and having a multiplicity of lugs projecting from its outer peripheral surface at intervals longitudinally along the crawler body; and a multiplicity of linear lateral reinforcing members extending laterally of the crawler body and arranged longitudinally along the crawler body; wherein the volume proportion of the lateral reinforcing members is high at the lateral center of the crawler body and low at the lateral outer portions of the crawler body.

In this arrangement, rigidity at the lateral center of the crawler body is further increased and thus lateral bending can be prevented, and volume proportion of the lateral reinforcing members near the lateral edges of the crawler is lowered and thus the increase in weight and cost can be prevented.

The third specific means for solving the problems according to the present invention is a resilient crawler comprising: a crawler body formed of a resilient material in the shape of an endless belt and having a multiplicity of lugs projecting from the outer peripheral surface at intervals longitudinally along the crawler body; and a multiplicity of linear lateral reinforcing members extending laterally of the crawler body and arranged longitudinally along the crawler body; wherein the lateral reinforcing members are arranged at close intervals with respect to each other in each portion of the crawler body where the lug is formed, and at larger intervals with respect to each other in each portion between the lugs, and wherein the volume proportion of the reinforcing members is high at the lateral center of the crawler body and low at the lateral outer portions of the crawler body.

Therefore, the same effect as the first and second means can be achieved simultaneously.

The fourth specific means for solving the problems according to the present invention is a resilient crawler of the second and third means, wherein a plurality of layers of reinforcing member each having a multiplicity of lateral reinforcing members longitudinally arranged in and along the length of the crawler body are provided in the thicknesswise direction of the crawler body, and wherein the lateral reinforcing members in each reinforcing member layer are different in lateral length from layer to layer and are centered laterally of the crawler body.

Therefore, arrangement of the lateral reinforcing members in such a manner that the volume proportion is high in the lateral center and low in the lateral outer portions of the crawler body can easily be realized.

A fifth specific means for solving the problems according to the present invention is a resilient crawler according to any one of the first to third specific means, wherein a plurality of layers of reinforcing member each having a multiplicity of lateral reinforcing members longitudinally arranged in and along the length of the crawler body are provided in the thicknesswise direction of the crawler body, and wherein the lateral reinforcing members in each reinforcing member layer are oriented to intersect with respect to neighboring layers.

By arranging the lateral reinforcing members in each reinforcing member layer so as to intersect with respect to neighboring layers, lateral rigidity can further be increased.

The sixth specific means for solving the problems according to the present invention is a resilient crawler of any one of the first to the third specific means, further comprising a circumferentially tensile belt-shaped member buried in the crawler body on the inner side of the lateral reinforcing members.

In this arrangement, circumferential expansion of the crawler body is controlled and occurrence of separation of rubber and cracking at the portion between the lugs may certainly be prevented.

The seventh specific means for solving the problem according to the present invention is a resilient crawler according to any one of the first to third specific means, wherein the lateral reinforcing members disposed at the portion of the crawler body where the lug is formed are arranged to form a curve in a cross sectional view in the widthwise direction of the crawler body so as to penetrate into the lug.

In this arrangement, lateral rigidity is effectively increased and a sufficient quantity of rubber of the lug is assured to prevent occurrence of separation or cracking.

The eighth specific means for solving the problems according to the present invention is a resilient crawler comprising: a crawler body formed of a resilient material in the shape of an endless belt and having a multiplicity of lugs projecting from the outer peripheral surface at intervals longitudinally along the crawler body; a resilient core portion formed of a resilient material provided in the core portion in the lug of the crawler body; and a multiplicity of linear lateral reinforcing members extending laterally of the crawler body and arranged longitudinally along the crawler body; wherein the lateral reinforcing members are arranged at close intervals with respect to each other at the portion of the crawler body where the lug is formed, and at larger intervals with respect to each other at the portion between the lugs; wherein the volume proportion of the lateral reinforcing members is high at the center and low at outer portions in the widthwise direction of the crawler body; and wherein the lateral reinforcing members provided in the portion of the crawler body where the lug is formed are arranged so as to fringe the outer periphery of the resilient core portion.

According to this arrangement, in addition to the same effect as the first to the second embodiments, provision of the lateral resilient core portion can prevent the lug from being filled with the lateral reinforcing members more than necessary, and thus the resilient material can sufficiently spread around the lateral reinforcing members, so that separation and cracking can be prevented from being occurred between the lateral reinforcing members and the resilient material.

The ninth specific means for solving the problems according to the present invention is a resilient crawler comprising: a crawler body formed of a resilient material in the shape of an endless belt and having a multiplicity of lugs projecting from the outer peripheral surface at intervals longitudinally along the crawler body; a resilient core portion formed of a resilient material provided in the core portion in the lug; and a multiplicity of lateral reinforcing members buried in the lug so as to fringe the outer periphery of the resilient core portion.

In this arrangement, the lug is prevented from being filled with the lateral reinforcing members more than necessary, and thus the resilient material can be sufficiently spread around the lateral reinforcing members, so that separation and cracking can be prevented from being occurred between the lateral reinforcing members and the resilient material.

In the ninth specific means, it is not specifically limited whether to bury the lateral reinforcing member along almost the whole circumference of the crawler body continuously or discontinuously, that is, whether to arrange the lateral reinforcing members circumferentially without intervals or to arrange the lateral reinforcing members at prescribed intervals so as to correspond to the portions between the lugs.

The tenth specific means for solving the problems according to the present invention is a resilient crawler of the ninth specific means, wherein a plurality of layers of reinforcing members each having a multiplicity of lateral reinforcing members longitudinally arranged along the length of the crawler body are provided in the thicknesswise direction of the crawler body.

In this arrangement, the volume proportion of the lateral reinforcing members with respect to the lug is increased within a proper range, which leads to increase in lateral rigidity both for the crawler body and for the lug.

The eleventh specific means for solving the problems according to the present invention is a resilient crawler of the ninth specific means, wherein the lateral reinforcing member is dispersed longitudinally of the crawler body at the positions corresponding to the edge of the lugs in the lateral direction of the crawler.

It means that the lateral reinforcing members are buried in a broad range exceeding the width of the lug in the lateral direction of the crawler body, and dispersion of the lateral reinforcing members longitudinally of the crawler body can enhance the integrity thereof with the lug and the crawler body, which leads to increase in lateral rigidity both for the crawler body and for the lug.

The twelfth specific means for solving the problems according to the present invention is a resilient crawler of the ninth specific means, wherein the volume-proportion of the lateral reinforcing member in the lug is 5% to 20%.

When the volume proportion is less than 5%, lateral rigidity to be provided by the lateral reinforcing members cannot be realized, and when it exceeds 20%, the adhesive force between the lateral reinforcing members and the resilient material becomes insufficient. Therefore, the volume proportion is preferably determined within the range described above.

The thirteenth specific means for solving the problems according to the present invention is a resilient crawler of the ninth specific means, wherein the lateral reinforcing members are buried in the lug so that $L1/L$ and $H1/H$ are each 30%–80%, where L is the width of the base portion of the lug, H is the height of the lug, $L1$ is the width of the base portion of the lateral resilient core portion, and $H1$ is the height of the lateral resilient core portion in the cross sectional view of the lug in the widthwise direction of the crawler body.

In this arrangement, the lateral reinforcing members can be buried at best positions.

When $L1/L<30\%$, the adhesive force between the lug and the crawler body is too low, and when $L1/L>80\%$, the lateral reinforcing members come to the position immediately below the outer surface of the lug, which may cause separation. When $H1/H<30\%$, sufficient lateral rigidity of the crawler body cannot be realized, and when $H1/H>80\%$, the lateral reinforcing members come to the position immediately below the force-bearing surface of the lug, which may result in breakage. Therefore, it is more preferable to set $L1/L$ and $H1/H$ within the range of 40% to 60%.

According to the ninth to thirteenth embodiments described above, the distribution of the lateral ground pressure of the lug on the crawler body is equalized and thus the tractive performance is significantly improved. In addition, since the crawler body can be made thinner and thus the bending rigidity at the portion of the crawler body wrapped around the wheel can be reduced significantly, the torque loss when being driven, or on traveling, is reduced, and accordingly, the resultant improvement of fuel consumption and the effect of push-pull resistance lead to the improvement of the traveling performance.

The fourteenth specific means for solving the problems according to the present invention is a resilient crawler of the ninth specific means, wherein the lateral reinforcing member is buried in the portion of the crawler body between the lugs so as to intersect the longitudinal direction of the belt.

In this arrangement, even when the volume proportion of the lateral reinforcing members in the lug is reduced, lateral rigidity of the crawler body increases.

When a pin-system is employed for driving the resilient crawler as the fifteenth specific means for solving the problems according to the present invention, it is recommended to employ a resilient crawler of the ninth specific means, wherein drive transmission projections to assist drive transmission are formed on the inner peripheral surface of the crawler body at the positions corresponding to the portions where the lugs are formed.

As the sixteenth specific means for solving the problems according to the present invention, it is recommended to employ a resilient crawler of the ninth specific means, wherein the lug includes a long lug having a longer length along the width of the crawler body and a short lug having a shorter length in the widthwise direction of the crawler arranged in a mixed manner at a specified proportion in the longitudinal direction of the crawler, and wherein the drive transmission projection is provided on the inner surface of the crawler body at the position corresponding to the portion where the long lug is formed.

In this case, the long lug and the part of the crawler body close to it is high in rigidity in comparison with that of the short lug as a matter of course because of its length, and the extent of generation of the tractive force, or driving force, of the long lug is larger than that of the short lug, whereby providing a drive transmission projection corresponding to the long lug is more logical.

The seventeenth specific means for solving the problems according to the present invention is a resilient crawler of the ninth specific means, wherein the tread surface of the lug is formed with a plurality of edge portions for preventing side skid arranged at a plurality of locations along the width of the crawler body with their longitudinal direction oriented along the longitudinal direction of the crawler body.

In this arrangement, a suitable countermeasure for side skid is taken, and thus it is especially useful for snowmobiles or the like in which employment of a lightweight resilient crawler is recommended.

The eighteenth specific means for solving the problems according to the present invention is a resilient crawler of the ninth specific means, wherein the crawler body is provided with a plurality of circumferential tensile members buried in the longitudinal direction thereof.

In this arrangement, expansion of the crawler body in the longitudinal direction is prevented and rigidity is increased.

The nineteenth specific means for solving the problems according to the present invention is a resilient crawler of the ninth specific means, wherein the resilient core portion is formed of a high-hardness rubber of at least 60° in hardness (JIS Shore A-type).

The present invention provides a method of manufacturing a resilient crawler as set forth in the ninth specific means comprising the steps of: providing a vulcanizing die having a recess for molding belt shaped crawler bodies and a plurality of molding recesses for molding lugs formed along the longitudinally of the recess for molding crawler bodies so as to increase the depth of the crawler mold recess; filling the die with a resilient material and laying a plurality of linear lateral reinforcing members with their longitudinal direction oriented laterally of the recess for molding the crawler body so that the lateral reinforcing members are interposed between the resilient material like a sandwich; and carrying out vulcanization of this combination with the dies mated to obtain a crawler body comprising lugs with the lateral reinforcing members moved by melted resilient materials therearound to positions fringing the resilient core portions within the lugs.

In this way, the lateral reinforcing members can be buried in the lug so as to fringe the core portion with the core portion left as it is by means of flowing property of the resilient material at the time of vulcanization, whereby the structure of the resilient crawler as the ninth specific means can easily be manufactured.

The manufacturing method described above further comprises a step of subjecting the reinforcing member layer including a multiplicity of the lateral reinforcing members formed into almost the same length as that of the lug to the electron beam treatment before filling it into the vulcanizing die.

This eliminates variations, or unevenness, of movement of the lateral reinforcing members, and facilitates operation such as filling into the die.

BRIEF DESCRIPTION OF THE DRAWINGS

FIG. 1 is a resilient crawler according to the first embodiment of the present invention, in which

FIG. 2 is a cross sectional view taken along the line D—D in FIG. 3;

FIG. 7 is a resilient crawler according to the fourth embodiment of the present invention, wherein

DETAILED DESCRIPTION OF THE PREFERRED EMBODIMENTS

Figure 1A:
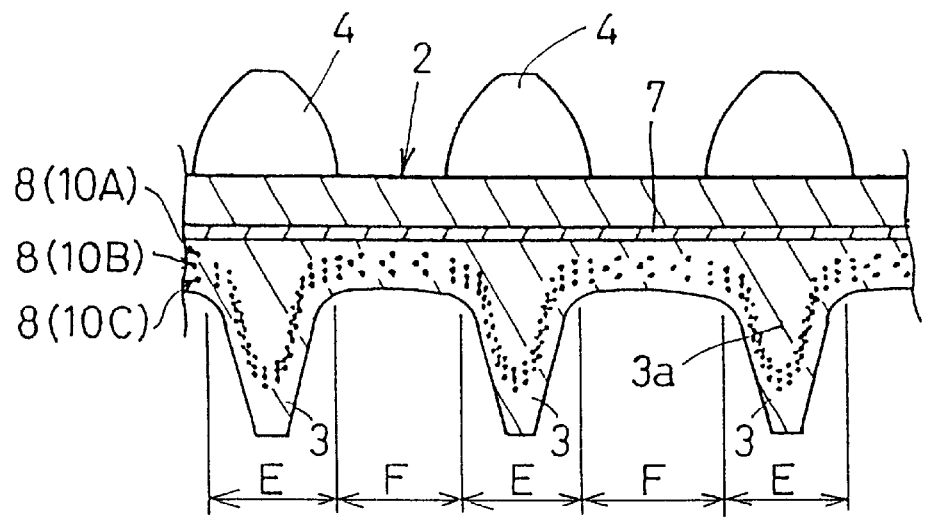
FIG. 1A is a cross sectional view taken along the line A—A in FIG. 2.

Referring now to the drawings, an embodiment of the present invention will be described.

Figure 1B:
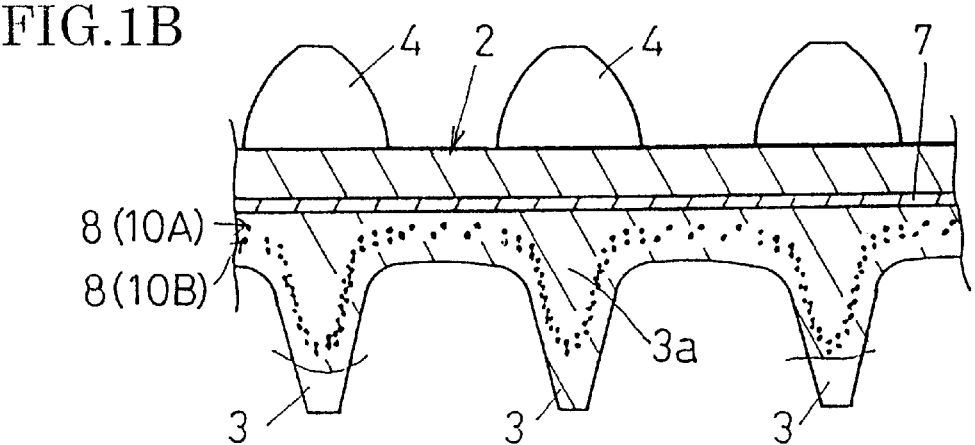
FIG. 1B is a cross sectional view taken along the line B—B.
Figure 1C:
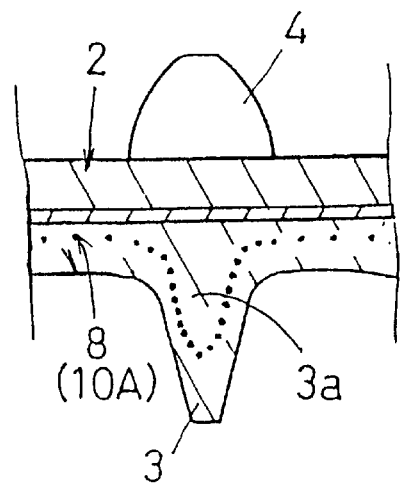
FIG. 1C is a cross sectional view taken along the line C—C.
Figure 3:
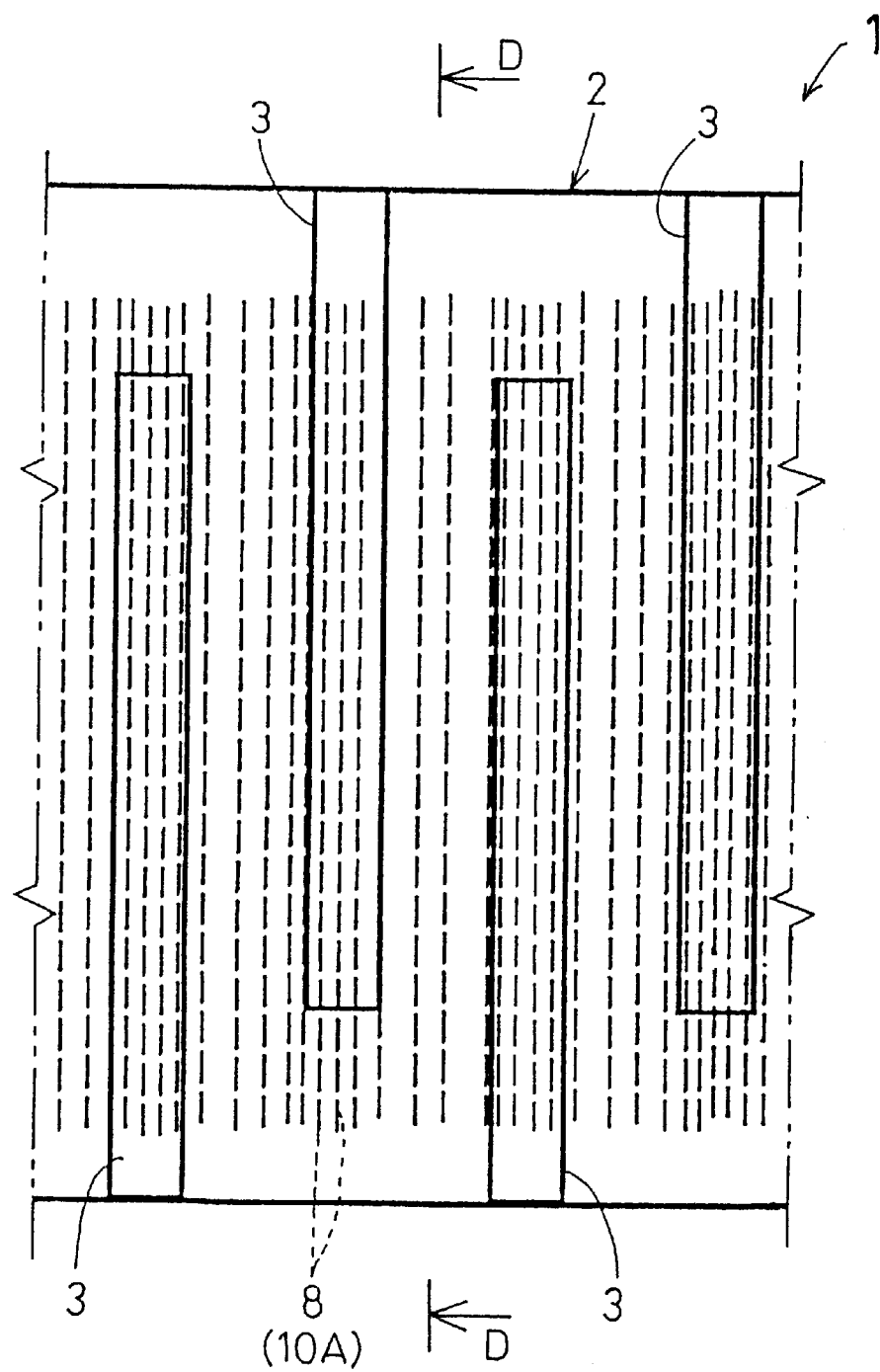
FIG. 3 is a bottom view of the resilient crawler.

As shown in FIG. 1 to FIG. 3, a resilient crawler 1 of the present invention is formed of a resilient material such as rubber in the shape of an endless belt, and comprises a crawler body 2 to be wrapped around a driving wheel, a following wheel, and a rolling wheel provided on a track frame of an endless crawler vehicle.

The crawler body 2 has a multiplicity of lugs 3 projecting from the outer peripheral surface at regular intervals along the longitudinal direction thereof, and a pair of the left and right drive transmission projections 4 projecting from the inner peripheral surface at regular intervals along the longitudinal direction thereof.

The lugs 3 each having substantially trapezoidal shape in cross section are formed linearly along the width of the crawler body 2 and arranged in such a manner that lugs extending in the lateral (widthwise) direction of the crawler body 2 from one lateral end of the crawler body 2 through the center to the midway of the lateral half on the opposite side and lugs extending from the other lateral end of the crawler body 2 through the center to the midway of the lateral half on the opposite side are arranged alternately along the circumference of the crawler body 2.

Figure 15:
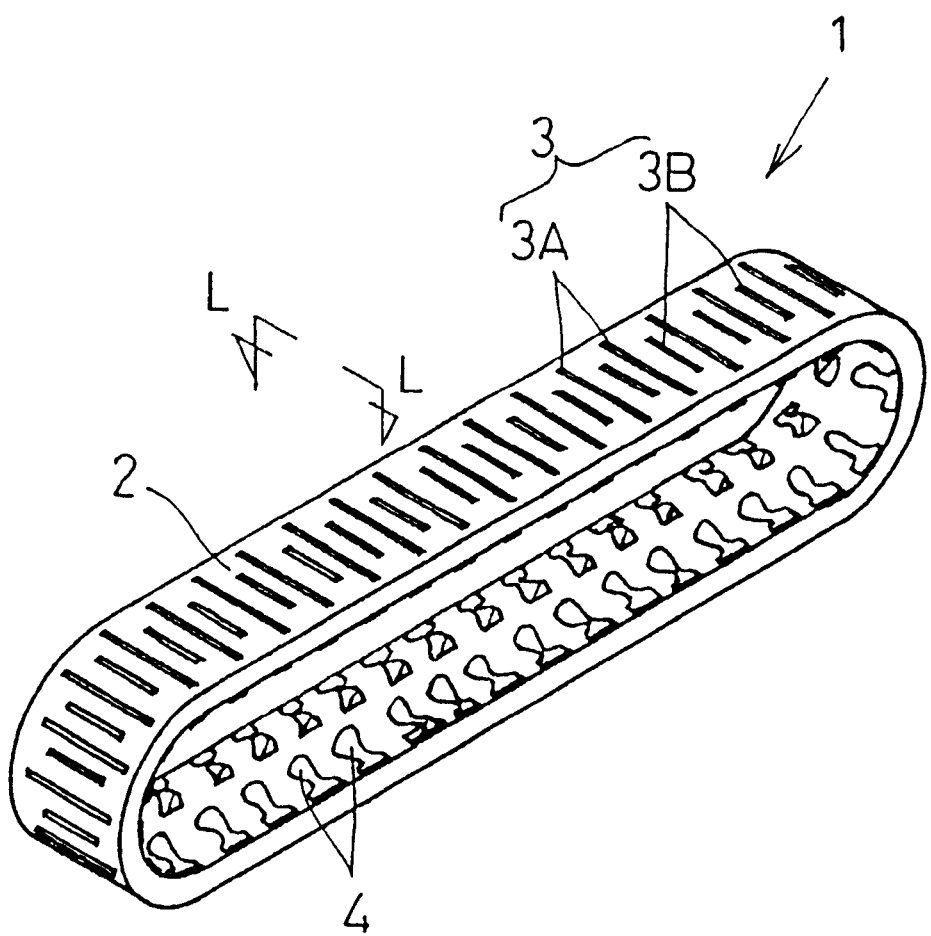
FIG. 15 is a perspective view showing a resilient crawler according to the fourth embodiment.

The lugs 3 may be, as shown in FIG. 15 for example, arranged in such a manner that laterally elongated lugs 3A and short lugs 3B are alternately arranged along the longitudinal direction of the crawler body 2 at the lateral center thereof, and the lugs may be arranged in a slanted manner with respect to the lateral direction of the crawler body 2.

When a wheel having a multiplicity of driving pins on the outer periphery of a driving disk is adopted as a driving wheel, the drive transmission projection 4 constitutes a projection for engaging the driving pin for transmitting driving force, and engaging the rolling wheel for serving as a guide to prevent run-off.

However, when a sprocket is adopted as a driving wheel, the engaging holes for inserting the teeth of the sprocket are formed on the lateral center at intervals along the circumference of the crawler body 2.

In the crawler body 2, a circumferential tensile member 7 is buried, and lateral reinforcing members 8 are buried on the outer side of the tensile member.

The circumferential tensile member 7 and the lateral reinforcing body 8 are both constructed of a steel cord formed by twisting several bundles of twisted several steel filaments, a cord constructed of filaments of nylon, tetron, or the like, as well as an alamid fiber cord, a reinforcing cord formed of Kevlar and so on.

The circumferential tensile body 7 is formed into an endless belt shape along the circumference of the crawler body 2, and a plurality of the same are arranged in parallel side by side. The lateral reinforcing member 8 is arranged so as to extend in the direction of the width of the crawler body 2 and a plurality of the same are arranged along the whole circumference of the crawler body 2.

In this embodiment, a plurality of lateral reinforcing members 8 are arranged to form three reinforcing member layers 10A–10C disposed in the thicknesswise direction of the crawler body 2.

In each of the reinforcing member layers 10A–10C, the lateral reinforcing members 8 buried in the portion E where the lug 3 is formed are arranged to form a curve along the outside surface of the lug 3 so as to penetrate into the lug 3. The lug 3 is provided with a resilient core portion 3a in the similar configuration (analogous shape) to the lug 3 along the width of the crawler body 2 so as to arrange the lateral reinforcing members 8 along the periphery of the resilient core portion 3a.

Providing the lateral resilient core portion 3a as described above prevents the lug from being filled with the lateral reinforcing members 8 more than necessary.

The lateral reinforcing members 8 buried in the portion E where the lug 3 is formed are arranged with small intervals to each other, and the lateral reinforcing members 8 buried in the portion F between the lugs are arranged with large intervals, whereby the number of the lateral reinforcing members 8 in the portion E where the lug is formed practically increases, while the number of the lateral reinforcing members 8 at the portion F between the lugs decreases.

Therefore, the lateral rigidity of the lug 3 is increased to assure traction, and flexibility at the portion F between the lugs when it comes around the driving wheel, the following wheel or the like is assured.

At the same time, providing lateral reinforcing members 8 in the portion F between the lugs assures a certain extent of rigidity and thus the difference in rigidity with respect to the portion E where the lug is formed can be reduced, thereby preventing the rolling wheel from sinking into the crawler.

As shown in FIG. 2, the lateral reinforcing member 8 provided on the inner peripheral side of the crawler body 2 (in the innermost layer 10A) is formed to be the longest in lateral length, and the lateral reinforcing member 8 disposed on the outer peripheral side (in the outermost layer 10C) is formed to be the shortest in lateral length, and the lateral reinforcing member 8 disposed between them (in the intermediate layer 10B) has a lateral length between the lengths of the reinforcing members in the outermost layer 10C and those in the innermost layer 10A.

The lateral reinforcing members 8 in each reinforcing member layer 10A–10C are disposed at the lateral center of the crawler body 2, and thus all the lateral reinforcing members 8 of the respective layers 10A–10C are overlapped in the lateral center region G of the crawler body 2. On the laterally outer portions of the crawler body 2, there is formed regions H where the intermediate layer 10B and the innermost layer 10A are overlapped, and regions K where only the innermost layer 10A is provided.

Therefore, the number of the lateral reinforcing members 8 is the largest at the lateral center portion of the crawler body 2, and gradually decreases toward the lateral outer portions thereof. In other words, the volume proportion of the lateral reinforcing members 8 is high at the lateral center portion of the crawler body 2, and low at the lateral outside portion thereof.

Therefore, since the rigidity is the highest at the lateral center portion of the crawler body 2, the crawler body 2 is prevented from being curved significantly when the rolling wheel rolls along this center portion. Likewise, since the volume proportion is low at the lateral outer portions of the crawler body 2, lightweight of the crawler body 2 is realized.

Figure 4:
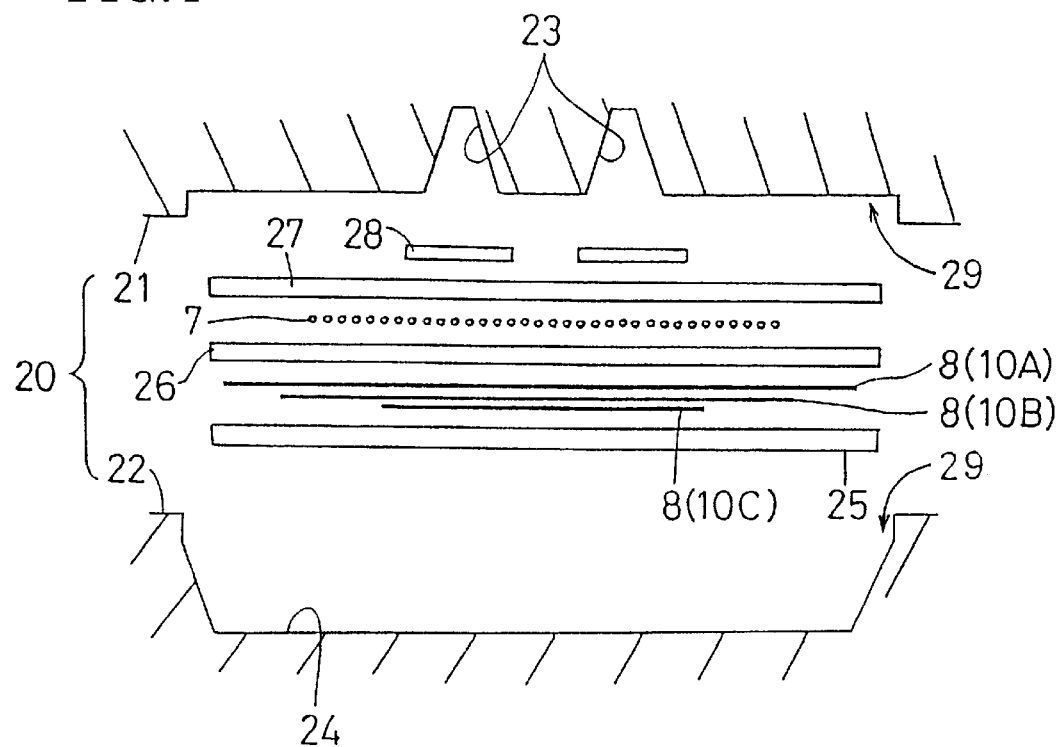
FIG. 4 is a front cross sectional view showing a vulcanizing metal mold for resilient crawlers.

FIG. 4 shows a vulcanizing die 20 to be used for manufacturing the resilient crawler 1 described above.

The vulcanizing die 20 comprises the upper die 21 and the lower die 22, and the upper die 21 is formed with an upper portion of the recess 29 for molding crawler bodies and the recess 23 for molding drive transmission projections, and the lower die 22 is formed with the lower portion of the recess 29 for molding crawler bodies and the recess 24 for molding lugs.

Therefore, the recess 29 for molding crawler bodies is divided in the thicknesswise direction of the crawler bodies into two portions along the parting line between the upper and lower dies 21, 22.

The recess 23 for molding drive transmission projections and the recess 24 for molding lugs are formed into prescribed configurations, respectively, by increasing the depth of the recess for molding the crawler bodies in the upper die 21 and the lower die 22 at a plurality of locations along the length thereof.

The vulcanizing process is performed by laying a resilient material 25, a lateral reinforcing member 8, a resilient material 26, a circumferential tensile member 7, and resilient materials 27, 28 in this order from the lower layer between the upper die 21 and the lower die 22, mating the upper die 21 and the lower die 22, and carrying out pressurizing and heating steps in a prescribed manner.

In this vulcanizing process, the lateral reinforcing members 8 are moved to form a curve along the configuration of the lug by being pulled into the recess 24 for molding lugs during the flowing of the resilient material 25 to be filled into the recess 24 for molding lugs. As a consequence, the structure in which the intervals of the lateral reinforcing members 8 are close at the portion E where the lug is formed, and the intervals of the lateral reinforcing members 8 are large at the portion F between the lugs can easily be realized.

At the same time, a lateral resilient core portion 3a having the similar configuration (analogous shape) to the lug 3 is formed on the inner side of the layers of the lateral reinforcing members 8.

The lateral reinforcing members 8 and the circumferential tensile members 7 are respectively rubberized (coated by rubber) after placing a number of them side-by-side, and passed through the electron beam treatment apparatus to be processed into a semi-cured state, that is, the state having a hardness to the extent where the user can handle it easily, in advance to prevent them from falling apart so that they can easily be handled.

Figure 5:
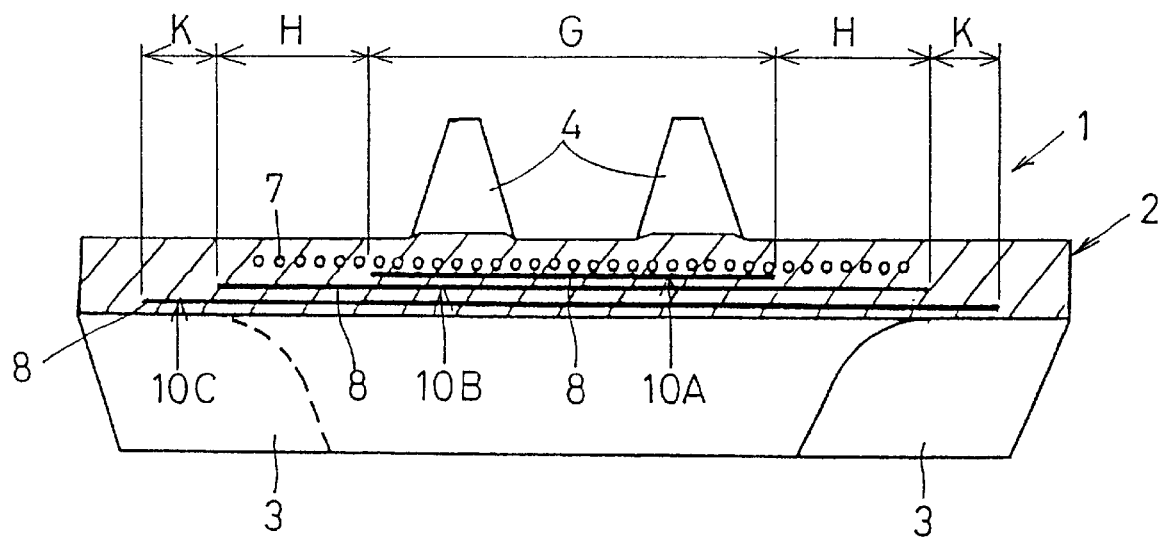
FIG. 5 is a front cross sectional view of a resilient crawler according to the second embodiment of the present invention (a drawing corresponding to FIG. 2)

FIG. 5 shows a second embodiment of the resilient crawler 1 according to the present invention.

In this embodiment, as in the embodiment described above, three layers of reinforcing member 10A–10C are provided in the thicknesswise direction of the crawler body 2, wherein the lateral reinforcing member 8 in the outermost layer 10C is formed to be the longest and the lateral reinforcing member 8 in the innermost layer 10A is formed to be the shortest.

In this arrangement, when setting the layers of reinforcing member 10A–10C for vulcanizing molding as shown in FIG. 4, the lateral reinforcing members 8 can be precisely centered sequentially from the lateral reinforcing members 8 of the outermost layer 10C that is the longest in lateral length.

Other structure and effects are the same as the first embodiment described above.

Figure 6:
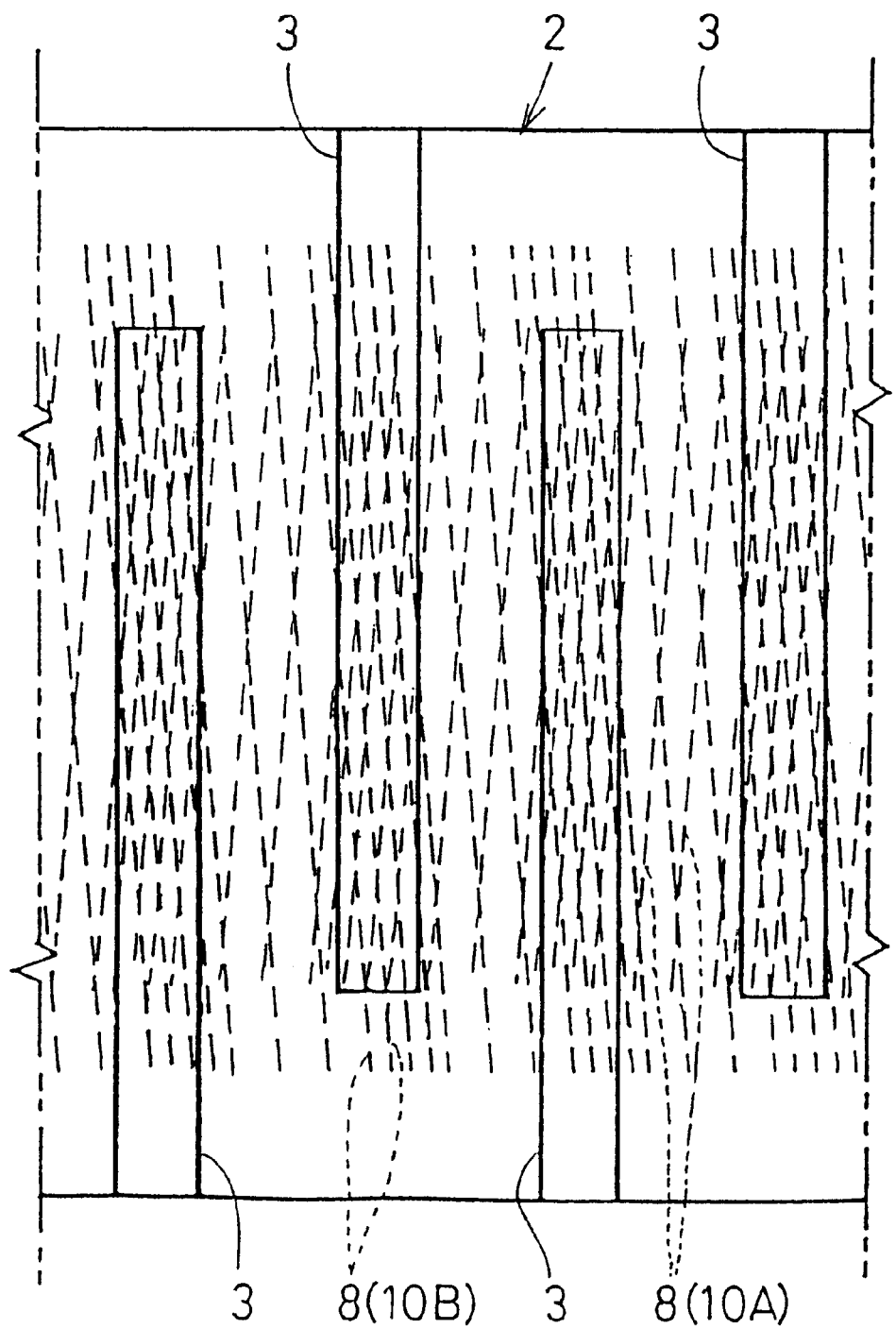
FIG. 6 is a bottom view of a resilient crawler according to the third embodiment of the present invention.

FIG. 6 shows a third embodiment of the resilient crawler 1 of the present invention.

In this embodiment, the crawler body 2 comprises two layers of reinforcing member 10A and 10B, and the lateral reinforcing members 8 in the respective layers 10A and 10B are arranged in a slightly slanted manner with respect to the lateral direction of the crawler body 2.

The lateral reinforcing members 8 for the respective layers of the reinforcing member 10A, 10B differ in length, and are arranged at the lateral center so that the reinforcing members 8 intersect with each other from layer to layer.

In this embodiment, almost the same effect as the first embodiment can be expected. However, by intersecting the lateral reinforcing members 8 of the respective layers 10A and 10B, a reinforcing relationship with respect to each other is established for lateral bending of the crawler body 2, thereby increasing lateral rigidity.

In the case described above, it is also possible to arrange the lateral reinforcing members 8 in an intersecting manner by placing the lateral reinforcing members 8 in one of the layers in parallel with the lateral direction of the crawler body 2, and placing the lateral reinforcing members 8 in the other of the layers in a slanted manner.

Though the number of the layers of reinforcing members in the embodiment described above is three or two, there may be provided one layer or more than three layers.

Alternatively, it is also possible to make the length of reinforcing members in the respective layers the same, and arrange them at close intervals at the portion where the lug is formed and at coarse intervals at the portion between the lugs.

Alternatively, it is also applicable that intervals of the lateral reinforcing members are set to be uniform both for the portion where the lug is formed and for the portion between the lugs, and the volume proportion is set to be high at the lateral center and low at the lateral outer portions thereof.

FIG. 7 to FIG. 15 show a fourth embodiment of the resilient crawler 1 of the present invention.

The resilient crawler 1 has, as shown in FIG. 15, elongated lugs 3A having a longer lateral length and short lugs 3B having a shorter lateral length, which are arranged alternately along the longitudinal direction of the crawler body 2.

The elongated lug 3A extends the whole lateral length of the crawler body 2, and the short lug 3B is laterally centered so as to form soil-discharging, or snow discharging, portions on both sides thereof. The soil-discharging, or snow discharging, portions on both sides of the short lug 3B are effective for giving a suitable flexibility to the crawler body 2, reducing the total traveling resistance (ground contact area) of the lug 3, and contributing to smooth discharge of soil or snow in the lateral direction.

Figure 9:
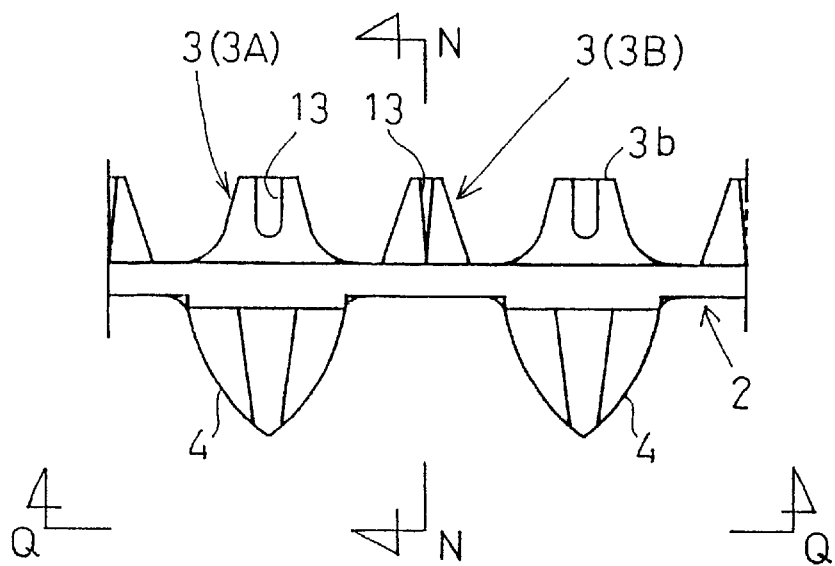
FIG. 9 is a view from the direction of the arrow M—M in FIG. 8.

As shown in FIG. 9, it is preferable to dispose the drive transmission projections (ridges) 4 at positions corresponding to the elongated lugs 3A among the lugs 3 in consideration of strength and tractive force, or driving force, of the crawler body 2. This is because the short lugs 3B are centered laterally on the crawler body 2 to form soil-discharging, or snow-discharging, portions (flexibility promoting portions) on both sides thereof.

The lateral reinforcing members 8 of this embodiment are arranged at the positions in the lugs 3 including the elongated and short lugs 3A, 3B so as to extend almost along the widthwise direction of the crawler body 2, and intersect the longitudinal direction of the crawler body 2.

The reinforcing member layer 10 is formed by arranging a multiplicity of lateral reinforcing members 8 along the belt, and a plurality (three in the example shown in the figure) of layers 10 of the reinforcing member are overlapped in the thicknesswise direction of the crawler body 2.

In this case, the resilient material, or the material forming the crawler body 2 penetrates not only among the reinforcing members 8 in each layer, but also between each of the layers of reinforcing members 8.

The lateral reinforcing members 8 of this embodiment are, as in the case of the previous embodiment, buried so as to be disposed along the outer periphery of the cross section of the resilient core portion 3a provided in the core portion of the lug 3.

As a consequence, the inside of the lug 3 is prevented from being filled with lateral reinforcing members 8 more than necessary.

This embodiment is different from the first to third embodiments described above in that the disposition of the lateral reinforcing members 8 is disconnected once at every root portion of the lugs 3 with respect to the crawler body 2. In other words, both ends of the area where the lateral reinforcing members 8 are disposed as described above extends partly into the portions between the adjacent lugs 3, but not to the greater part of these portions.

Figure 7A:
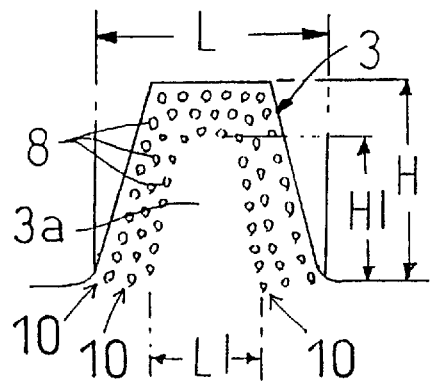
FIG. 7A is a side view of the lug.

Referring now to FIG. 7A, the state of burying the lateral reinforcing members 8 is described more specifically. The volume proportion of the lateral reinforcing member 8 in the lug 3 is 5% to 20%. When it is less than 5%, sufficient lateral rigidity due to burying the cord cannot be realized, and when it exceeds 20%, adhesive (joining) force between the cord and the rubber decreases.

More specifically, the lateral reinforcing bodies 8 are buried in the lug in such a manner that L1/L and H1/H are respectively 30%–80%, where L is the width of the base portion of the lug 3, H is the height of the lug 3, L1 is the width of the base portion of the resilient core portion 3a, and H1 is the height of the resilient core portion 3a.

When the value of L1/L is less than 30%, the adhesive force between the lug 3 and the crawler body 2 is too low, and thus the lug 3 is in danger of coming off (peeling off) due to tractive load when traveling. On the other hand, when the value of L1/L exceeds 80%, the lateral reinforcing members 8 are disposed in the position immediately below the outer surface of the lug 3, which may cause breakage or separation of the cord.

When the value of H1/H is less than 30%, sufficient enhancement of rigidity by reinforcing members 8 cannot be expected, and when the value of H1/H exceeds 80%, the lateral reinforcing members 8 are disposed in the position immediately below the outer surface of the lug 3, which may result in breakage or separation of the cord.

Therefore, it is more preferable to set L1/L and H1/H within the range of 40% to 60%.

In this embodiment, various tests were conducted with the volume proportion of the lateral reinforcing members 8 in the lug 3 in the range from 16.8% to 19.6%. In any case, undesirable separation or cracking between the lateral reinforcing members 8 (between the cords) or between the lateral reinforcing member 8 and the resilient material did not occur.

Though specific details on the position or the volume proportion of the lateral reinforcing members 8 buried in the lug are not described in the first to third embodiments described above, the same structure as the present embodiment can be employed as a matter of course.

Figure 8:
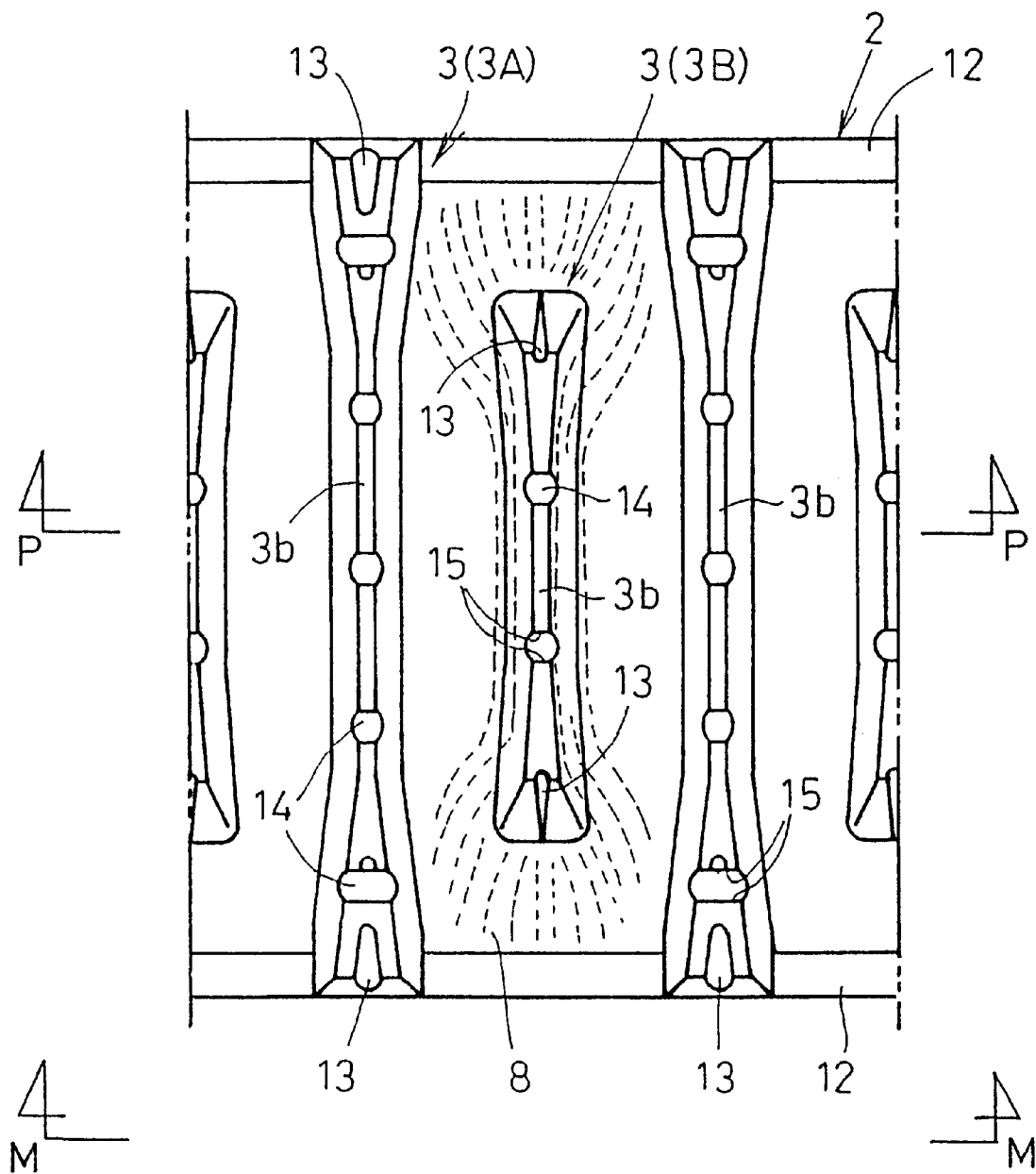
FIG. 8 is an enlarged view seen in the direction of the arrow L—L in FIG. 15.

As shown in FIG. 8 which shows only the short lug 3B positioned in the center as a representative example, the intervals between the lateral reinforcing members 8 are gradually increased, that is, the lateral reinforcing members 8 are dispersed, longitudinally of the crawler body from the positions corresponding to the ends of the lugs in the lateral direction of the crawler body toward the lateral ends of the crawler body in accordance with the flow of rubber at the time of vulcanizing molding.

As a consequence, the integrity of the crawler body 2 and the lug 3 is enhanced, thereby advantageously increasing lateral rigidity of the crawler body 2 and the lug 3 respectively.

The structure in which the lateral reinforcing members 8 are dispersed at the positions corresponding to the ends of the lug 3 is especially effective for the short lug 3B that does not extend along the whole width of the crawler body 2 (in other words, the short configuration). Since the length of the lateral reinforcing member 8 can be determined to be longer than that of the short lugs 3B, sufficient length for dispersion can easily be obtained. Therefore, it is logically reasonable to employ such a dispersing structure only for the short lugs 3B.

However, it is not limited to the short lugs 3B. A structure in which the end portions of the lateral reinforcing members 8 are dispersed from positions corresponding to the ends of the elongated lugs 3A may also be employed.

The crawler body 2 is provided with a reinforcing belt 12 along the whole circumferential length at both lateral sides thereof in the state in which the thickness is slightly increased toward the outer peripheral surface, i.e., the surface on which the lugs 3 are provided. The surface of the reinforcing belts 12 are raised together with the root portion of the elongated lug 3A at the positions crossing the elongated lug 3A, and then integrated with the front and rear surfaces of the elongated lug 3A in such a manner that it is absorbed thereby.

The reinforcing belt 12 having an effect to enhance the rigidity of a part of the crawler body 2 reinforces the crawler body 2 to prevent occurrence of chipping-off of pieces under operation. In addition, even when the chipping-off of pieces occurs by any chance, it has an effect to prevent the ends of the lateral reinforcing members 8 buried in the short lug 3B or the like from being exposed or projecting, that is, an effect to hold the dispersed edges in place.

In the arrangement where that the lateral reinforcing members 8 are dispersed only at the ends of the short lugs 3B but not of the elongated lugs 3A, the reinforcing belt 12 described above has an effect to hold the end portions of the lateral reinforcing members 8 buried in the elongated lugs 3A strongly, and consequently the same effect as for the short lugs 3B can be obtained (balanced durability).

Both of the elongated lug 3A and the short lug 3B are respectively formed thin at the lateral center portion of the crawler body 2 and gradually increase in thickness so as to fan out toward the ends thereof. In this arrangement, rigidity of the lug 3 against a lateral load applied as the vehicle travels along a curve is increased.

Each end of the lugs 3 thus increased in thickness is provided with a longitudinal stress releasing groove 13 opening toward the tread surface 3b, which controls excessive increase in volume in association with the increase in thickness and alleviates excessive increase in rigidity. Providing the stress releasing groove 13 leads to decrease in material cost and in vulcanizing time for resilient material and thus of course in weight of the crawler body 2.

The tread surface 3b of the lug 3 is formed with a plurality of recesses 14 having semi-circular contour in closs section and passing through the surface 3b in the longitudinal direction of the crawler body 2 at a plurality of locations along the width thereof. Therefore, the opened edges of the respective recesses 14 on the tread surface 3b are formed with a pair of side skid preventing edges 15 extending longitudinally of the crawler body 2.

Figure 7B:
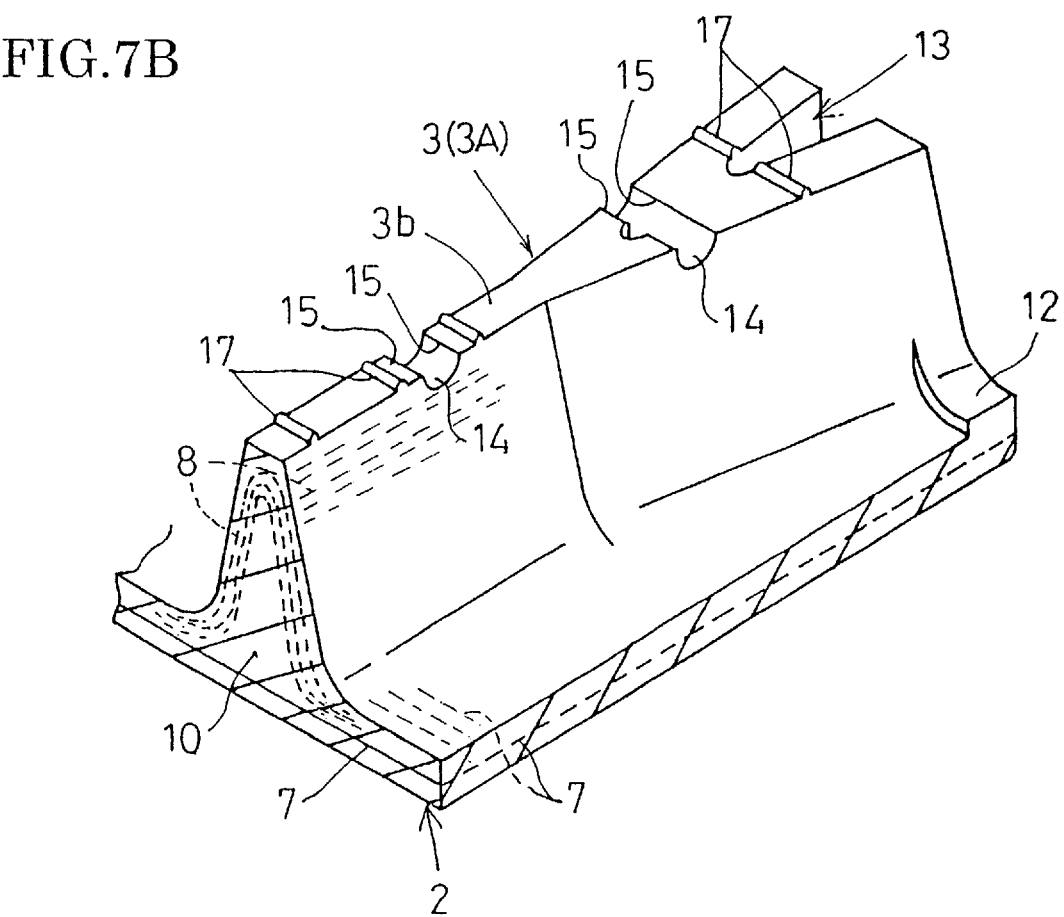
FIG. 7B is an enlarged perspective view showing a principal portion of the resilient crawler shown in FIG. 15.

In addition, as shown in FIG. 7, the tread surface 3b of the lug 3 is provided with a plurality of second side skid preventing edges 17 in the form of ridges extending longitudinally of the crawler body 2.

These side skid preventing edges 15, 17 enhance the side skid preventing effect.

Providing the recesses 14 as described above controls excessive increase in volume of the lug 3, and alleviates excessive increase in rigidity, and also leads to decrease in material cost and in vulcanizing time for resilient material as well as in weight of the crawler body 2 as a matter of course.

The recesses 14 are, as is apparent in FIG. 8, misaligned laterally between the lugs 3 adjacent to each other in the longitudinal direction of the crawler body 2 (in the figure, they are arranged in zigzag pattern). This arrangement prevents lowering of the tractive force (driving force).

The second side skid preventing edges 17 may be used as an air-vent hole for each lug 3 at the time of molding of the crawler body 2, and the vulcanizing die to be used in this case does not require any special process. In other words, providing the side skid preventing edge 17 neither makes manufacturing of the resilient crawler 1 complicated nor increases the cost.

Figure 10:
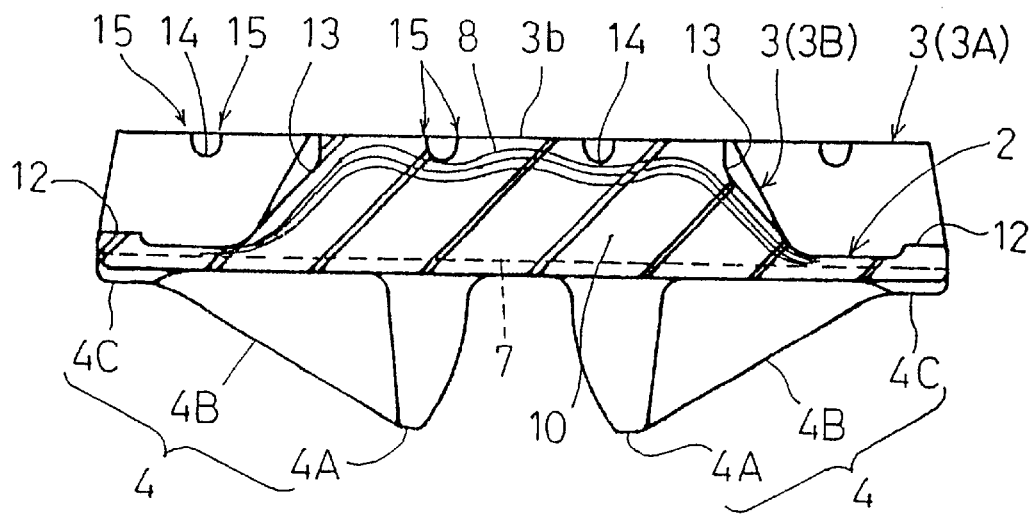
FIG. 10 is an enlarged cross-sectional view taken along the line N—in FIG. 9.
Figure 12:
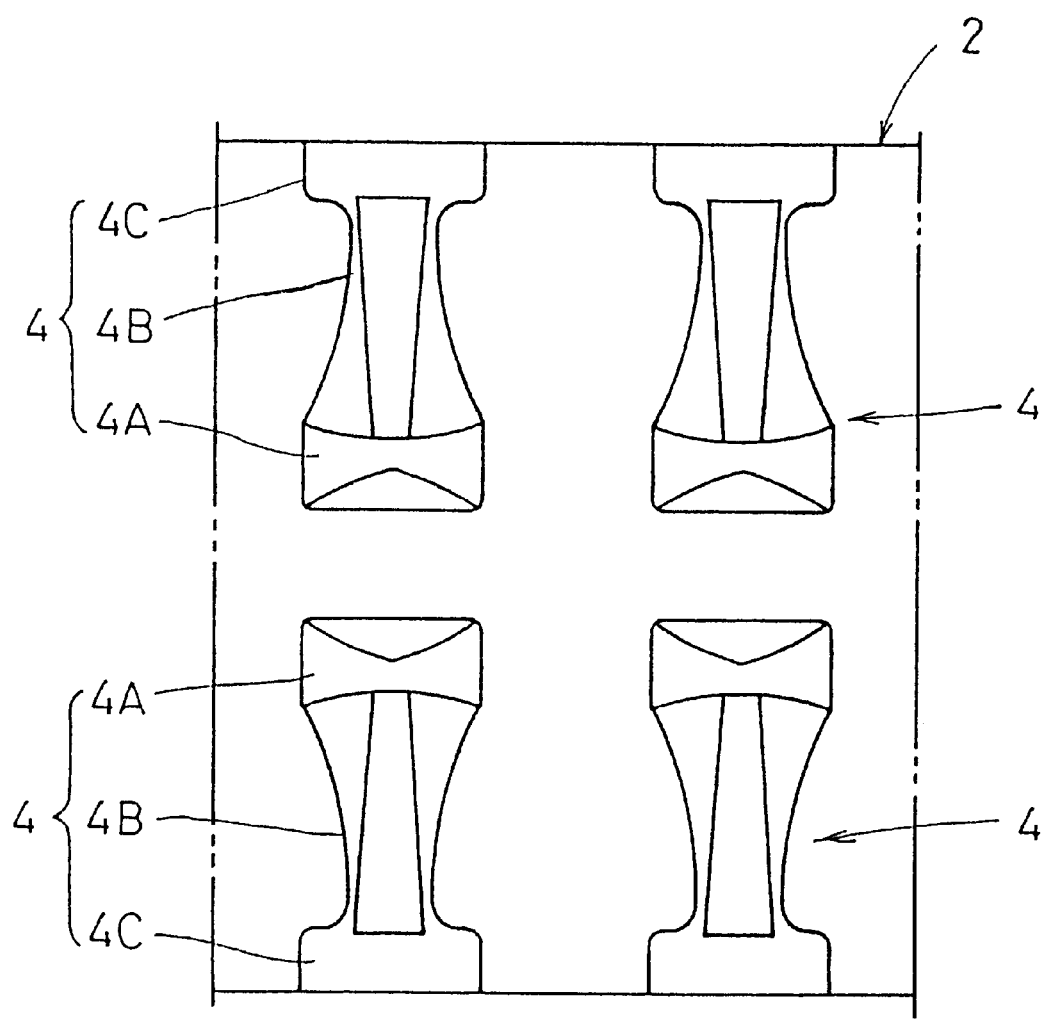
FIG. 12 is a view seen from the direction of the arrow Q—Q in FIG. 9.

As shown in FIG. 10 and FIG. 12, the drive transmission projection 4 provided on the inner surface of the crawler body 2 projects in the shape of a mountain having the highest point (claw portion 4A) at a position closest to the lateral center of the crawler body 2, and gradually decreasing in height and thickness toward the lateral outside of the crawler body 2 (narrow portion 4B), and at the laterally outermost portion of the crawler body 2 is formed into a rectangular base extending in the longitudinal direction of the crawler body (tail portion 4C).

In such a configuration, the narrowed potion 4B contributes to reduce cost of the resilient material, vulcanizing time, and weight of the crawler body 2, and the tail portion 4C contributes to ensure the rigidity.

Since the adjacent drive transmission projections 4 are not connected with each other, that is, thick portions such as the tail portions 4C are not connected in the longitudinal direction of the crawler body 2, flexibility of the crawler body 2 for winding around the sprocket (not shown) will not be impaired.

Figure 13:
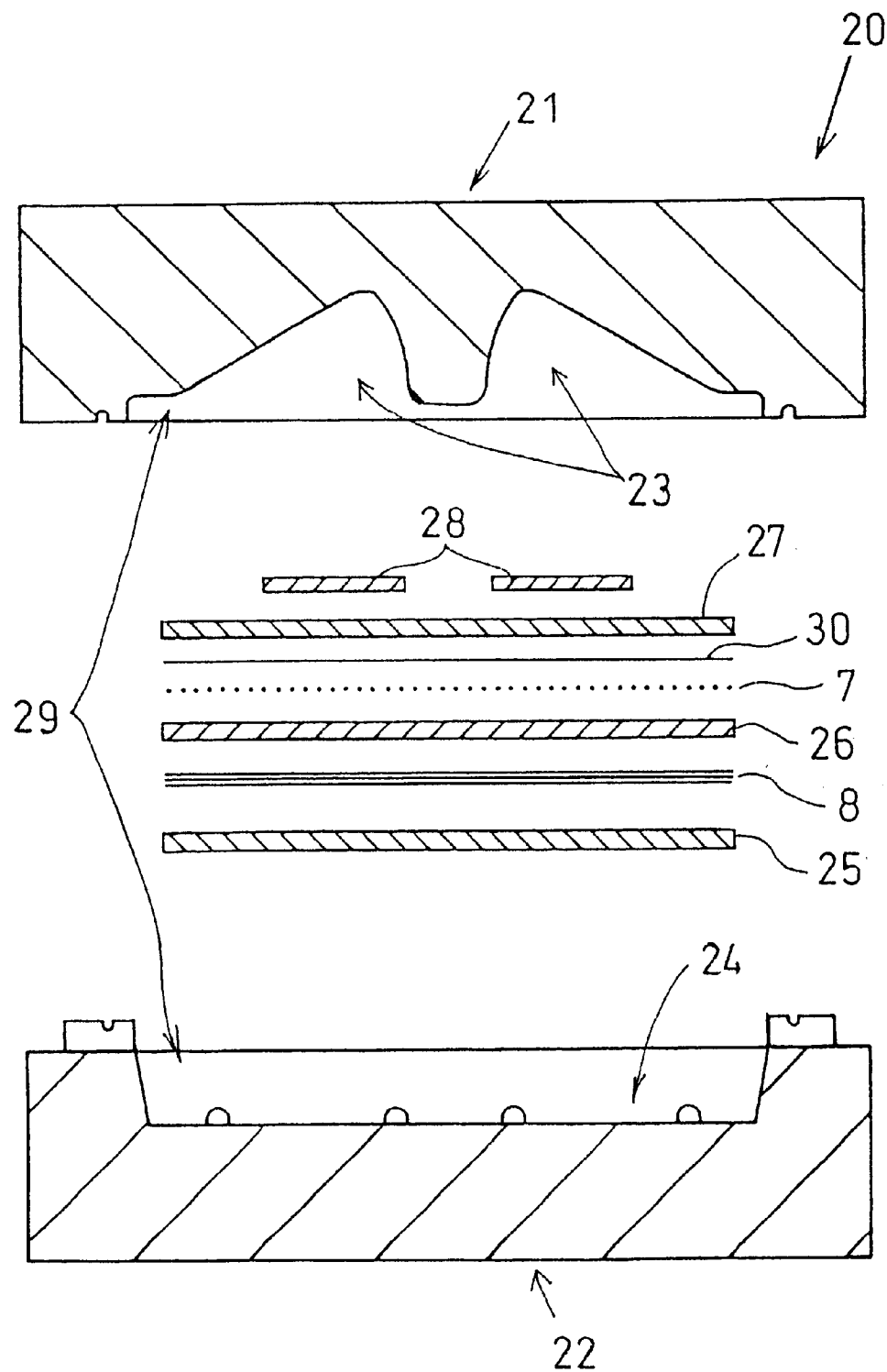
FIG. 13 is a cross-sectional view explaining a vulcanizing die used in the method of manufacturing the resilient crawler of the fourth embodiment in the direction corresponding to FIG. 10.
Figure 14:
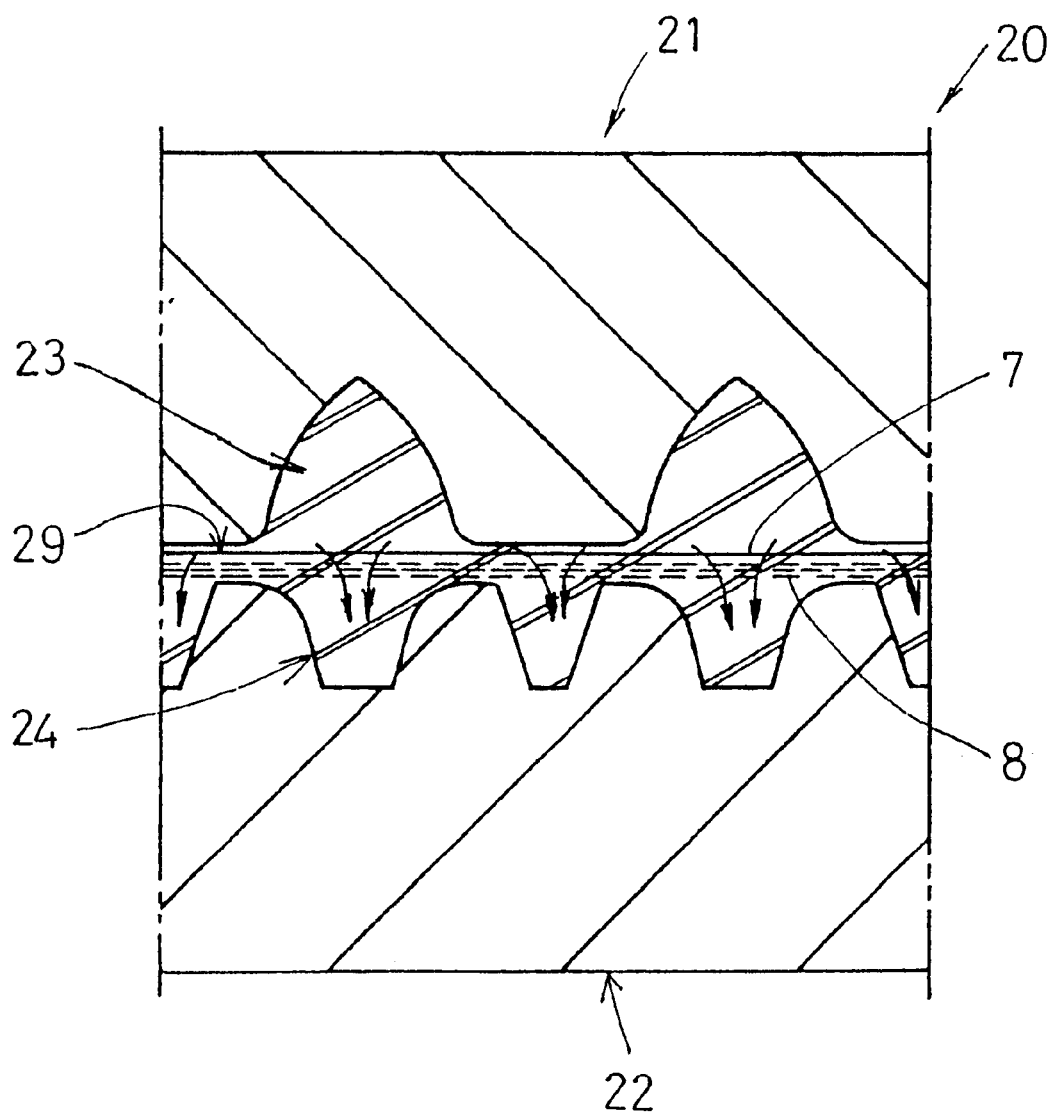
FIG. 14 is a cross sectional view explaining the vulcanizing die used the method of manufacturing the resilient crawler of the fourth embodiment in the direction corresponding to FIG. 9.

FIG. 13 and FIG. 14 relate to a method of manufacturing the resilient crawler of this embodiment, and show the vulcanizing process for manufacturing the crawler body 2 described above. Though it is almost the same as the vulcanizing process described in conjunction with the first embodiment, the entire process will be described in detail again. The matters described only in conjunction with this embodiment will also be employable in the manufacturing process (vulcanizing process) of the first embodiment.

In this vulcanizing process, a vulcanizing die 20 comprising a recess 29 for molding crawler bodies, a recess 24 for molding lugs, and a recess 23 for molding drive transmission projections in the mated state is used.

The vulcanizing die 20 comprises a lower die 22 and an upper die 21, and the recess 29 for molding crawler bodies is divided in the thicknesswise direction of the crawler bodies along the parting line between these two dies 21, 22.

The lower die 22 is provided with a recess 24 for molding lugs, and the upper die 21 is provided with a recess 23 for molding drive transmission projections. The recesses 24 for molding lugs and recesses 23 for molding drive transmission projections are formed into prescribed configurations, respectively, at a plurality of locations along the longitudinal direction of the recesses 29 for molding crawler bodies (the direction perpendicular to the paper of FIG. 13, or the lateral direction in FIG. 14) by increasing the depth of the recess 29.

It should be noted that it is also possible to provide recesses 24 for molding lugs on the upper die 21 and recesses 23 for molding projections on the lower die 22.

As shown in FIG. 13, the lateral reinforcing members 8 and the resilient materials 25–28 which are passed through the electron beam treatment apparatus (not shown) in advance to process them into a semi-cured state (the state having a hardness to the extent where the user can handle it easily) are laid into the recess 29 for molding crawler bodies of the vulcanizing die 20.

The electron beam treatment of the tensile members 7, 8 in advance to the vulcanization prevents the cords from falling apart and facilitates the handling thereof.

It is preferable to employ the softest material as the material 25 that is laid in the nearest layer to the recess 24 for molding lugs (or the portion that forms the surface of the lug 3) among the resilient materials 25–28, and hard materials are employed as all other materials 26, 27, 28.

In this case, the lateral reinforcing members 8 are interposed between the soft resilient material 25 and the hard resilient materials 26–28 in a sandwiching manner. The longitudinal length of the lateral reinforcing member 8 is almost the same as the length of the lug, or the width of the crawler, and is oriented laterally of the recess 29 for molding crawler bodies.

The circumferential tensile member 7 is interposed between the resilient material and the lateral reinforcing member 8 with a resilient material 26 interposed between itself and the lateral reinforcing member 8. It is more preferable to overlap a reinforcing layer 30 formed of cloth or the like on the circumferential tensile member 7.

Figure 11:
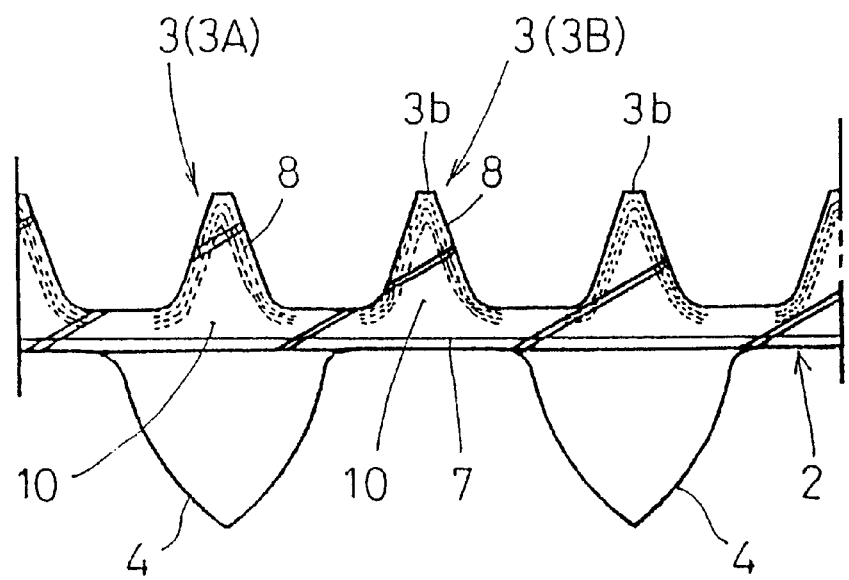
FIG. 11 is a cross-sectional view taken along the line P—P in FIG. 8.

By mating the vulcanizing die 20 in this state, and performing the vulcanizing process by carrying out pressurizing and heating steps in the prescribed manner, as shown in FIG. 14, the lateral reinforcing members 8 are moved to form a curve along the configuration of the lug and penetrates into the recesses 24 for molding lugs due to the flow of the resilient materials 25–28 into the recesses 24 for molding lugs, whereby the arrangement and configuration shown in FIG. 7, FIG. 10, and FIG. 11 are finally formed.

At the same time, the lateral resilient core portion 3a in a similar (analogous) configuration to the lug 3 is formed on the inner side of the lateral reinforcing member 8, and it is advantageous to employ high-hardness rubber of 60 or more degrees in JIS Shore hardness A-type for the core portion 3a.

It should be noted that the present invention is not limited to any of the details of description in conjunction with the embodiments described above, but may be modified within the scope of the appended claims.

What is claimed is:

1. A resilient crawler comprising:
   a crawler body formed of a resilient material in the shape of an endless belt and having a multiplicity of lugs projecting from the outer peripheral surface at intervals longitudinally along the crawler body; and
   a multiplicity of linear reinforcing members arranged in a series extending in a longitudinal direction of the crawler with each of the reinforcing members of the series being disposed in the crawler body so as to extend in a lateral direction of the crawler body;
   wherein said reinforcing members are arranged at close intervals with respect to each other in each portion of said crawler body where said lugs are formed, and at larger intervals with respect to each other in each portion between said lugs, wherein the reinforcing members that are located in the portions where each said lug is formed are arranged in a curve-shaped configuration that extends along the contour of each lug within each lug.

2. A resilient crawler as set forth in claim 1, wherein a plurality of layers of reinforcing members, each of which is formed by arranging a number of said reinforcing members longitudinally along said crawler body, are successively provided in the crawler body in the thicknesswise direction thereof; and
   wherein said reinforcing members in each reinforcing member layer are oriented to intersect with each other from layer to layer.

3. A resilient crawler as set forth in claim 1, further comprising a circumferential tensile member formed in an endless belt shape, the tensile member being buried in said crawler body on the inner peripheral side of said reinforcing members.

4. A resilient crawler comprising:
   a crawler body formed of a resilient material in the shape of an endless belt and having a multiplicity of lugs projecting from the outer peripheral surface at intervals longitudinally along the crawler body; and
   a multiplicity of linear reinforcing members arranged in a series extending in a longitudinal direction of the crawler with each of the reinforcing members of the series being disposed in the crawler body so as to extend in a lateral direction of the crawler body;
   wherein the volume proportion of said lateral reinforcing members is high at the lateral center of said crawler body and low at the lateral outer portions of said crawler body, wherein the reinforcing members that are located in the portions where each said lug is formed are arranged in a curve-shaped configuration that extends along the contour of the lug within the lug.

5. A resilient crawler as set forth in claim 4, wherein a plurality of layers of reinforcing members, each of which is formed by arranging a number of said reinforcing members longitudinally along said crawler body, are successively provided in the crawler body in the thicknesswise direction thereof; and wherein said reinforcing members in each reinforcing member layer are different in length from those of the other reinforcing member layers and are centered laterally of said crawler body.

6. A resilient crawler as set forth in claim 4, wherein a plurality of layers of reinforcing members, each of which is formed by arranging a number of said reinforcing members longitudinally along said crawler body, are successively provided in the crawler body in the thicknesswise direction thereof; and wherein said reinforcing members in each reinforcing member layer are oriented to intersect with each other from layer to layer.

7. A resilient crawler as set forth in claim 4, further comprising a circumferential tensile member formed in an endless belt shape, the tensile member being buried in said crawler body on the inner peripheral side of said reinforcing members.

8. A resilient crawler comprising:

a crawler body formed of a resilient material in the shape of an endless belt and having a multiplicity of lugs projecting from the outer peripheral surface at intervals longitudinally along the crawler body; and a multiplicity of linear reinforcing members arranged in a series extending in a longitudinal direction of the crawler with each of the reinforcing members of the series being disposed in the crawler body so as to extend in a lateral direction of the crawler body;

wherein said lateral reinforcing members are arranged at close intervals with respect to each other in each portion of said crawler body where said lugs are formed, and at larger intervals with respect to each other in each portion between said lugs, wherein the reinforcing members that are located in the portions where each said lug is formed are arranged in a curve-shaped configuration that extends along the contour of the lug within the lug; and wherein the volume proportion of said reinforcing members is high at the lateral center of said crawler body and low at the lateral outer portions of said crawler body.

9. A resilient crawler as set forth in claim 8, wherein a plurality of layers of reinforcing members, each of which is formed by arranging a number of said reinforcing members longitudinally along said crawler body, are successively provided in the crawler body in the thicknesswise direction thereof; and wherein said reinforcing members in each reinforcing member layer are different in length from those of the other reinforcing member layers and are centered laterally of said crawler body.

10. A resilient crawler as set forth in claim 8, wherein a plurality of layers of reinforcing members, each of which is formed by arranging a number of said reinforcing members longitudinally along said crawler body, are successively provided in the crawler body in the thicknesswise direction thereof; and wherein said reinforcing members in each reinforcing member layers are oriented to intersect with reinforcing members of adjacent reinforcing member layers.

11. A resilient crawler as set forth in claim 8, further comprising a circumferential tensile member formed in an endless belt shape, the tensile member being buried in said crawler body on the inner peripheral side of said reinforcing members.

12. A resilient crawler comprising:

crawler body formed of a resilient material in the shape of an endless belt and having a multiplicity of lugs projecting from the outer peripheral surface at intervals longitudinally along the crawler body;

a resilient core portion formed of a resilient material provided in the core portion in said lug of said crawler body; and a multiplicity of linear reinforcing members arranged in a series extending in a longitudinal direction of the crawler with each of the reinforcing members of the series being disposed in the crawler body so as to extend in a lateral direction of the crawler body;

wherein said reinforcing members are arranged at close intervals with respect to each other in each portion of said crawler body where said lugs are formed, and at larger intervals with respect to each other in each portion between said lugs, wherein the reinforcing members that are located in the portions where each said lug is formed are arranged in a curve-shaped configuration that extends along the contour of each lug within each lug wherein the volume proportion of said reinforcing members is high at the lateral center of said crawler body and low at the lateral outer portions of said crawler body; and wherein said lateral reinforcing members provided in the portion of said crawler body where the lug is formed are arranged along the outer periphery of said resilient core portion.

* * * * *